United States Patent [19]

Dierichs et al.

[11] Patent Number: 4,505,964

[45] Date of Patent: Mar. 19, 1985

[54] DEHESIVE LINING PAPER FOR WALL COVERINGS COMPRISING A FLEECE LAMINATED TO A FILM HAVING A LOW-ENERGY SURFACE

[75] Inventors: Wolfgang Dierichs, Dusseldorf; Werner Eberhardt, Leverkusen; Jurgen Wegner, Dusseldorf, all of Fed. Rep. of Germany

[73] Assignee: Henkel Kommanditgesellschaft auf Aktien, Dusseldorf, Fed. Rep. of Germany

[21] Appl. No.: 528,276

[22] Filed: Aug. 31, 1983

[30] Foreign Application Priority Data

Sep. 11, 1982 [DE] Fed. Rep. of Germany ....... 3233848

[51] Int. Cl.[3] ........................ B32B 33/00; B44C 7/00; E04F 13/20

[52] U.S. Cl. ...................................... 428/85; 156/247; 156/280; 156/313; 156/344; 428/92; 428/95; 428/286; 428/297; 428/303; 428/337; 428/339; 428/340

[58] Field of Search ..................... 428/86, 95, 96, 224, 428/286, 340, 297, 303, 85, 92, 337, 339, 904.4; 156/280, 313, 247, 344

[56] References Cited

U.S. PATENT DOCUMENTS

| | | | |
|---|---|---|---|
| 2,491,530 | 12/1949 | Stubblebine | 428/904.4 |
| 2,982,680 | 5/1961 | Ellis et al. . | |
| 3,160,548 | 12/1964 | Gillick et al. | 428/904.4 |
| 3,390,403 | 6/1968 | Van Tilburg | 428/92 |
| 3,574,656 | 4/1971 | Sauntson et al. | 428/904.4 |
| 3,663,269 | 5/1972 | Fischer | 428/904.4 |
| 3,788,941 | 1/1974 | Kupits | 428/904.4 |
| 3,795,567 | 3/1974 | Hoffman | 428/904.4 |
| 3,983,278 | 9/1976 | Wardle | 428/92 |
| 4,278,719 | 7/1981 | Sarnecki | 428/95 |
| 4,293,458 | 10/1981 | Gruenberger et al. | 428/904.4 |
| 4,360,554 | 11/1982 | Campbell et al. | 428/95 |
| 4,397,192 | 4/1983 | Wahlquist | 428/198 |
| 4,415,617 | 11/1983 | D'Elia | 428/95 |

FOREIGN PATENT DOCUMENTS

| | | |
|---|---|---|
| 2261401 | 6/1974 | Fed. Rep. of Germany . |
| 2091982 | 1/1972 | France . |
| 1184563 | 3/1970 | United Kingdom . |

*Primary Examiner*—James C. Cannon
*Attorney, Agent, or Firm*—Ernest G. Szoke; Henry E. Millson, Jr.; Mark A. Greenfield

[57] ABSTRACT

Lining paper having a dehesive surface for wallpapers of all kinds and heavy wall coverings which consists of a fleece laminated on one side with a thin plastic film.

21 Claims, No Drawings

DEHESIVE LINING PAPER FOR WALL COVERINGS COMPRISING A FLEECE LAMINATED TO A FILM HAVING A LOW-ENERGY SURFACE

This invention relates to a special lining paper having a dehesive surface which is suitable for hanging wallpapers and wall coverings of all kinds and from which the wallpapers and wall coverings are easy to remove.

BACKGROUND OF THE INVENTION

Wallpapers and wall coverings are generally applied to walls using standard wallpaper pastes and adhesives based on methyl cellulose, carboxymethyl cellulose and/or starch. The subsequent removal of wallpapers presents numerous problems when new wallpapers are to be applied. To this end, the old wallpapers and wall coverings have to be removed. This is generally difficult and time consuming. The surface of the wallpaper is normally soaked with water and/or a wallpaper stripper to soften the wallpaper and the wallpaper adhesive or wallpaper paste. The wallpaper may then be removed from the wall. The task becomes particularly difficult in the case of waterproof wallpapers and wall coverings or in the case of wallpapers and wall coverings comprising a waterproof surface layer. To cope with the latter types, the waterproof layer first has to be destroyed, for example, by means of a spiked roller.

In general, the following methods are used for changing or removing wallpapers, papers and various wall coverings consisting mainly of flexible polyvinyl chloride, polyvinyl chloride foam and polystyrene:

(a) The wallpaper or wall covering is applied to a strippable lining paper. More specifically, a special-purpose adhesive or paste is first spread over the wall and the strippable lining paper subsequently applied to the adhesive or paste. Wallpapers or wall coverings are then applied to the lining paper by means of standard wallpaper pastes or wall covering adhesives. To remove the wallpaper, the lining paper is stripped so that although the wallpaper or wall covering stuck to the strippable lining paper can be removed, this can only be done once and, before the new wallpaper is hung, a new strippable lining paper has to be applied and any remains of the first strippable lining paper removed. This is of course uneconomically time consuming and expensive.

(b) The dry-stripping of wallpapers can be carried out by providing the back of the wallpaper with a dehesive coating or even by impregnating the wall with a dehesive preparation. The wallpaper is then hung using a standard paste. However, the adhesive used should be suitably compatibilized with the dehesive finish. It is also known that completely dry-strippable wallpapers can be produced by providing an intermediate layer between the wallpaper and the layer of paste or adhesive by which the wallpaper is secured to the wall or substrate. British Pat. No. 1,184,563 describes a dry-strippable wallpaper consisting of a non-woven, fibrous sheet-form material which, on the side facing the wall, is coated first with a resin-like or wax-like strippable preparation and then with a layer of water-activatable adhesive. After the layer of adhesive has been activated by water, the wallpaper is secured to the wall, although it may be subsequently stripped off without having to be soaked beforehand with water and/or a wallpaper stripper.

In this case, too, difficulties are involved in correctly coordinating the adhesive forces of the individual layers, quite apart from the fact that damage to the substrate can seldom be avoided during stripping.

(c) Another possibility is to apply a so-called size or adhesive emulsion to the wall to be papered. For example, a size of the type in question is applied once or twice in different dilution ratios, depending on the condition of the wall, i.e. the substrate. After a drying time of several hours, normally overnight, the wallpaper can be applied to the wall thus treated using a standard special-purpose adhesive based on methyl cellulose or carboxymethyl cellulose. By contrast, papers hung using starch paste cannot be stripped, nor can heavy wall coverings hung for example with emulsion-based adhesives. In this case, too, the various adhesive forces are difficult to coordinate and the substrate, i.e. the wall, can be damaged during stripping, which means that surfacing compositions having to be applied to the wall to prepare it for repapering.

(d) Special wall coverings can also be directly applied to the wall to be covered using special, suitable aqueous adhesives partly in the form of emulsions (Versois method). However, this method is attended by the disadvantage that, when the coverings are stripped off, local residues of adhesive or paste are left on the wall. In some cases, plaster may even be removed from the wall with the wall covering.

It is well known among experts that different substrates, i.e. walls of different quality, impose different demands on wall coverings in terms of hanging and, in particular, upon the adhesives used.

DESCRIPTION OF THE INVENTION

An object of the present invention is to provide a lining paper which is not attended by any of the above-mentioned disadvantages of conventional lining papers, and which can be adhesively applied to any of the substrates normally encountered in practice to which wall coverings, including wallpapers of all kinds as well as heavy wall coverings, can be applied using standard wallpaper pastes, including emulsion-based adhesives, and from which the wallpaper or wall covering can be repeatedly stripped off easily and without damaging the substrate, i.e. the wall and/or the lining paper, so that the lining paper can be used for repapering without any need to pretreat the substrate.

According to the invention, this object is achieved by a lining paper consisting of a fleece onto which a plastic film is laminated.

More particularly, the lining paper according to the invention consists of a random-fiber fleece onto which a very thin plastic film is laminated.

The fleece can consist of any of the usual materials for fleeces and can be selected from any of the various types of fleece. For example, the fleece can consist of polyolefins, for example polymers of ethylene, propylene, butylene or mixtures thereof.

The weight per unit area of the fleece is in the range of from about 30 to about 150 $g/m^2$, and preferably in the range of from about 50 to about 90 $g/m^2$.

The thin plastic film consists of a plastic having a low-energy surface. Examples of plastics such as these are polyolefins, such as polyethylene, polypropylene or polyisobutylene, preferably the homopolymers of these olefins. A very thin polyethylene film is preferred.

The film coating weighs between about 5 and about 30 $g/m^2$, and preferably between about 15 and about 25 $g/m^2$.

Thin silicone films or siliconized films can also be used as the plastic film.

The fleeces used for the lining paper according to the invention are produced in a known manner. The thin plastic films produced for the lining paper according to the invention are also produced by known methods. The laminate of the plastic film and the fleece is formed by known methods for preparing such laminates, e.g. by hot pressing the thin plastic film onto the fleece using rollers or other known hot laminating techniques.

Numerous improvements and advantages are obtained by use of the lining paper according to the invention. The lining paper can be adhesively applied to any of the substrates (walls) encountered in practice. Suitable adhesives are, for example, the known emulsion-based adhesives.

Standard wallpapers and also standard heavy wall coverings consisting, for example, of flexible polyvinyl chloride, polyvinyl chloride foam or polystyrene can be applied to the lining paper according to the invention. Wallpapers can be applied to the lining paper with the usual pastes based on methyl cellulose, carboxymethyl cellulose and/or starch. Heavy wall coverings can be applied with the usual emulsion-based adhesives.

Although the wallpapers or wall coverings thus applied adhere firmly to the lining paper according to the invention after drying of the wall, at least three changes of wallpaper can be made simply by removing the old wallpapers without destroying the lining paper and without any need for the surface to be filled and smoothed beforehand. The fact that the wall coverings and wallpapers can be repeatedly stripped off in this way is a considerable advantage over known methods.

The polyolefin fleeces used for the lining paper according to the invention generally have the following properties.

The polyolefin fleeces are either plain or needle fleeces with as many as 350,000 perforations per square meter. As stated above, the fleeces should have an average weight of from about 30 to 150 $g/m^2$, and should have a thickness of from about 0.10 to about 0.4 mm. The force required to separate the fleece from the substrate should be between about 10 and about 60 N/10cm.

Fleece separation was determined as follows.

The polyolefin fleece was bonded to a strip of an approximately 6 mm thick asbestos cement tile measuring 120×400 mm using a high-percentage unfilled emulsion-based adhesive. At its free end, the specimen thus bonded is subjected to a tractive force acting at a separation angle of 90° until the layer of adhesive breaks and the sample is separated from the substrate, i.e. until separation occurs. The force required for this purpose is determined by a suitable measuring instrument.

The invention is illustrated by the following Examples and Comparison Examples which are given for illustration purposes only and not to limit the invention. The polyolefin fleece used in the Examples was a fleece having the following properties:

polyolefin fleece in the form of a needle fleece having approximately 250,000 perforations per square meter
average weight: approximately 60 to 80 $g/m^2$
thickness: approximately 0.18 to 0.23 mm
strength of the fleece (separation strength): approximately 20 to 30 N/10 cm.

EXAMPLE 1

A lining paper according to the invention consisting of a polyolefin fleece covered by a thin film of polyethylene was bonded on the fleece side to a primed lime felt plaster using an unfilled, high-quality adhesive. After 24 hours, a wall covering of PVC foam (weight approximately 700 $g/m^2$, thickness approximately 2 to 2.5 mm) was bonded to the polyethylene film side of the lining paper according to the invention using a filled, high-quality emulsion-based adhesive.

Strength tests after 8 days showed that the wall covering could readily be stripped off the lining paper according to the invention in one piece, all the adhesive sticking to the back of the covering to leave the surface of the polyethylene film free from adhesive.

The test was stopped after 2 repetitions without any deterioration in the stripping effect or any damage to the lining paper.

COMPARISON EXAMPLE 1

The same wall covering as in Example 1 was applied to the same substrate as in EXAMPLE 1 using the same adhesive but without the lining paper according to the invention.

Strength tests after 8 days showed that the wall covering was partly destroyed on removal and partly stripped off with the upper plaster layer of the substrate.

EXAMPLE 2

A lining paper according to the invention consisting of a 70 g polyolefin fleece coated with a thin film of polyethylene was bonded on the fleece side to a primed gypsum board surface using an unfilled, high-quality adhesive. After 24 hours, a wallpaper of medium quality (weight approximately 140 $g/m^2$) was applied using a wallpaper paste based on methyl cellulose mixed in a ratio of 1:60.

Strength tests after 8 days showed that, despite adequate bond strength and good adhesion at the seams, the wallpaper could be stripped off dry from the lining paper in one piece length-after-length. This test was repeated twice in the same order without any damage to the film side of the lining paper.

COMPARISON EXAMPLE 2

The same wallpaper as in EXAMPLE 2 was applied to the same substrate using the same wallpaper paste mixed in the same ratio, but once again without the lining paper according to the invention. Strength tests after 8 days showed that the wallpaper could only be removed with difficulty and with some damage to the substrate by intensive treatment with water and wallpaper stripper.

EXAMPLE 3

A lining paper according to the invention of a 90 g polyolefin fleece covered by a film of polyethylene was bonded on the fleece side to a primed gypsum board surface using an unfilled high-quality adhesive. After 24 hours, a textile-covered PVC-wallpaper (weight approximately 270 $g/m^2$) was applied using an unfilled high quality adhesive.

Strength tests after 8 days showed that the wallpaper could be stripped off dry from the lining paper in one piece length-after-length without any damage to the film side. This test was successfully repeated three times without destruction of the lining paper.

COMPARISON EXAMPLE 3

The same PVC wallpaper was applied to the same primed gypsum board surface as in EXAMPLE 3 using the same unfilled high quality adhesive.

Strength tests after 8 days showed that, when the wallpaper was stripped off, the surface of the gypsum board was also partly stripped off and seriously damaged. Subsequent filling and smoothing of the substrate was unavoidable.

EXAMPLE 4

A lining paper according to the invention consisting of a 60 g polyolefin fleece covered by a film of polyethylene was applied on the fleece side to a primed gypsum board wall using an unfilled high quality adhesive. After 24 hours, a textured wallpaper was applied using a special-purpose paste based on methyl cellulose mixed in a ratio of 1:20. After another 24 hours, the wallpaper was coated with a waterproof emulsion paint.

Strength tests after 8 days showed that the wallpaper could be stripped off dry from the lining paper in one piece length-after-length without any damage to the polyethylene film side of the lining paper. This test was successfully repeated 5 times.

COMPARISON EXAMPLE 4

The same textured wallpaper as in EXAMPLE 4 was applied to the same substrate using the same special-purpose paste mixed in the same ratio.

After 24 hours, the textured wallpaper was coated with a waterproof emulsion paint.

Strength tests after 8 days showed that the wallpaper could only be removed from the substrate by roughening its surface and subjecting it to intensive treatment with water and wallpaper stripper.

EXAMPLE 5

A lining paper according to the invention consisting of a 65 g polyolefin fleece coated with a thin film of polyethylene was applied on the fleece side to a primed gypsum board surface using an unfilled high quality adhesive. After 24 hours, both a wallpaper of medium quality (weight approximately 140 $g/m^2$) and a heavy textured wallpaper were applied respectively using a wallpaper paste based on methyl cellulose mixed in a ratio of 1:60 and a special-purpose paste based on methyl cellulose mixed in a ratio of 1:20.

After 8 weeks, both wallpapers could be stripped off dry from the lining paper in one piece length-after-length without any damage to the film side. This test was successfully repeated twice at intervals of 6 weeks.

What is claimed is:

1. A lining paper consisting essentially of a fleece to be attached to a substrate laminated on one side with a thin plastic film having a low energy surface to which wallpapers and wall coverings are to be attached and from which successive changes of wallpapers and wall coverings may be removed without destroying the lining paper or requiring the surface to be filled and smoothed before attachment.

2. A lining paper in accordance with claim 1 wherein said fleece is a random fiber fleece.

3. A lining paper in accordance with claim 1 wherein said fleece is a polyolefin fleece.

4. A lining paper in accordance with claim 2 wherein said fleece is a polyolefin fleece.

5. A lining paper in accordance with claim 1 wherein the plastic film is a film of a homopolyolefin.

6. A lining paper in accordance with claim 4 wherein the plastic film is a film of a homopolyolefin.

7. A lining paper in accordance with claim 5 wherein the plastic film is a film of a homopolyethylene.

8. A lining paper in accordance with claim 6 wherein the plastic film is a film of homopolyethylene.

9. A lining paper in accordance with claim 1 wherein the weight of said fleece is between about 30 and about 150 $g/m^2$.

10. A lining paper in accordance with claim 1 wherein the weight of said fleece is between about 50 and about 90 $g/m^2$.

11. A lining paper in accordance with claim 1 wherein the weight of the thin plastic film is between about 5 and about 30 $g/m^2$.

12. A lining paper in accordance with claim 9 wherein the weight of the thin plastic film is between about 5 and about 30 $g/m^2$.

13. A lining paper in accordance with claim 1 wherein the weight of the thin plastic film is between about 15 and about 25 $g/m^2$.

14. A lining paper in accordance with claim 10 wherein the weight of the thin plastic film is between about 15 and about 25 $g/m^2$.

15. A lining paper in accordance with claim 1 wherein the fleece is between about 0.1 and about 0.4 mm thick and has a separation strength of from about 10 to about 60 N/10 cm.

16. A method of attaching wallpaper or a wall covering to a substrate comprising the steps of A. first attaching to said substrate a lining paper comprising a fleece laminated on one side with a thin plastic film, wherein the fleece side is attached to the substrate; and B. attaching wallpaper or wall covering to the plastic film side of said lining paper.

17. A method in accordance with claim 16 wherein the fleece portion of the lining paper is a random fiber fleece.

18. A method in accordance with claim 16 wherein the fleece portion of the lining paper is a polyolefin fleece.

19. A method in accordance with claim 17 wherein the fleece portion of the lining paper is a polyolefin fleece.

20. A method in accordance with claim 16 wherein the plastic film portion of the lining paper is a film of a homopolyolefin.

21. A method in accordance with claim 19 wherein the plastic film portion of the lining paper is a film of a homopolyolefin.

* * * * *